United States Patent
Decker et al.

(10) Patent No.: US 6,561,761 B1
(45) Date of Patent: May 13, 2003

(54) FLUTED COMPRESSOR FLOWPATH

(75) Inventors: John J. Decker, Liberty Township, OH (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/507,408

(22) Filed: Feb. 18, 2000

(51) Int. Cl.[7] .................................................. F01B 9/00
(52) U.S. Cl. ...................... 415/173.1; 415/191; 415/227
(58) Field of Search ........................... 415/173.1, 173.6, 415/207, 221, 227, 208.1, 224.5, 191, 210.1, 181

(56) References Cited

U.S. PATENT DOCUMENTS

| | | | |
|---|---|---|---|
| 3,316,714 A | * | 5/1967 | Smith et al. ............. 415/191 X |
| 4,194,869 A | * | 3/1980 | Corcokios ................ 415/191 X |
| 4,804,311 A | * | 2/1989 | Anderson et al. ........... 415/191 |
| 5,167,489 A | | 12/1992 | Wadia et al. |
| 5,397,215 A | | 3/1995 | Spear et al. ................. 415/191 |
| 5,642,985 A | | 7/1997 | Spear et al. |
| 5,735,673 A | | 4/1998 | Matheny et al. |
| 6,017,186 A | * | 1/2000 | Hoeger et al. ........... 415/191 X |

FOREIGN PATENT DOCUMENTS

EP 0801230 A2 10/1997

OTHER PUBLICATIONS

Harvey et al, "Non–Axisymmetric Turbine End Wal Design: Part I Three–Dimensional Linear Design Systems," ASME 99–GT–337, Jun. 7–10, 1999 Presentation.

* cited by examiner

Primary Examiner—John E. Ryznic
(74) Attorney, Agent, or Firm—Nathan D. Herkamp; Francis L. Conte

(57) ABSTRACT

A compressor flowpath includes circumferentially spaced apart airfoils having axially spaced apart leading and trailing edges and radially spaced apart outer and inner ends. An outer wall bridges the airfoil outer ends, and an inner wall bridges the inner ends. One of the walls includes a flute adjacent the leading edges for locally increasing flow area thereat.

23 Claims, 5 Drawing Sheets

FLUTED COMPRESSOR FLOWPATH

BACKGROUND OF THE INVENTION

The present invention relates generally to gas turbine engines, and, more specifically, to fans and compressors thereof.

In a turbofan gas turbine engine, air is pressurized or compressed in a compressor and mixed with fuel and ignited in a combustor for generating hot combustion gases. Energy is extracted from the gases in a high pressure turbine which powers the compressor, and also in a following low pressure turbine which powers a fan disposed upstream from the compressor.

A fan is a special form of a compressor having larger rotor blades which pressurize air for providing propulsion thrust for powering an aircraft in flight. The fan defines the first of many compressor stages in which air is increasingly compressed in turn.

Air pressurization is provided by converting rotary energy from the blades into velocity of the air which is then diffused to recover pressure therefrom. Diffusion occurs in locally diverging flowpaths and is limited by undesirable flow separation and corresponding compressor stall.

The fan blades are specifically configured to pump sufficient airflow for generating engine thrust during operation. The multistage compressor is specifically configured to supply high pressure air to the combustor for burning with fuel to generate energy for extraction by the downstream turbines.

A considerable challenge in designing these components is maximizing flow pumping capability and compression efficiency with suitable stall margin, and especially at high thrust conditions where the engine operates closest to its rotational speed and temperature limits. At high rotational speed, the flow Mach numbers relative to the rotor blades are high, and may be supersonic, and the aerodynamic loading or diffusion is also high. The aerodynamic challenge is further complicated by the mechanical and aero-mechanical limitations of the rotor blades themselves.

The fan and the compressor include rotor blades and stator vanes whose airfoils are specifically configured for maximizing performance within conventional constraints. Airfoil design involves many compromises in aerodynamic, mechanical, and aero-mechanical performance. The airfoils have three dimensional (3D) configurations which typically twist in span from root to tip and vary in thickness axially between leading and trailing edges for controlling aerodynamic loading over the corresponding pressure and suction sides thereof.

The flowpath through each compressor stage is defined circumferentially between adjacent blades or vanes, and radially by corresponding outer and inner end walls.

For example, the relatively long fan blades are disposed inside an annular fan casing which defines the radially outer flowpath boundary or outer wall. The blades extend radially outwardly from a supporting disk, and typically discrete inter-blade platforms are suitably mounted to the disk for defining the radially inner flowpath or inner wall.

Similarly, the compressor rotor stages include corresponding rows of rotor blades decreasing in span height in a downstream direction and disposed inside a corresponding annular casing defining a radially outer shroud around each stage. Compressor blades typically include integral blade platforms at the roots thereof which adjoin adjacent platforms for defining the inner flowpath.

And, the corresponding compressor stator stages include vanes affixed at their radially outer ends to an annular outer band typically formed in circumferential or arcuate segments. The radially inner ends of the stator vanes may be plain, or may be affixed to an annular inner band which defines the inner flowpath, which is also typically formed in arcuate segments.

All of the various forms of inner and outer flowpath boundaries described above are similar to each other and are axisymmetric. The outer walls are circumferentially concave and provide a smooth cylindrical or conical surface facing radially inwardly. The inner walls are circumferentially convex and provide a smooth cylindrical or conical surface facing radially outwardly.

For a given engine size and thrust requirement, the sizes of the rotor blades and stator vanes are specified or limited, and cooperate with correspondingly sized outer and inner flowpaths walls. With these deign constraints, the 3D configuration of the blades and vanes is varied in an attempt to maximize flow pumping and compression efficiency with suitable stall margin. Modem three-dimensional viscous computer analysis is used to advantage in designing compressor airfoils, yet performance is nevertheless limited as described above.

Accordingly, it is desired to further improve performance of gas turbine engine compressors and fans within geometric constraints therefor.

BRIEF SUMMARY OF THE INVENTION

A compressor flowpath includes circumferentially spaced apart airfoils having axially spaced apart leading and trailing edges and radially spaced apart outer and inner ends. An outer wall bridges the airfoil outer ends, and an inner wall bridges the inner ends. One of the walls includes a flute adjacent the leading edges for locally increasing flow area thereat.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
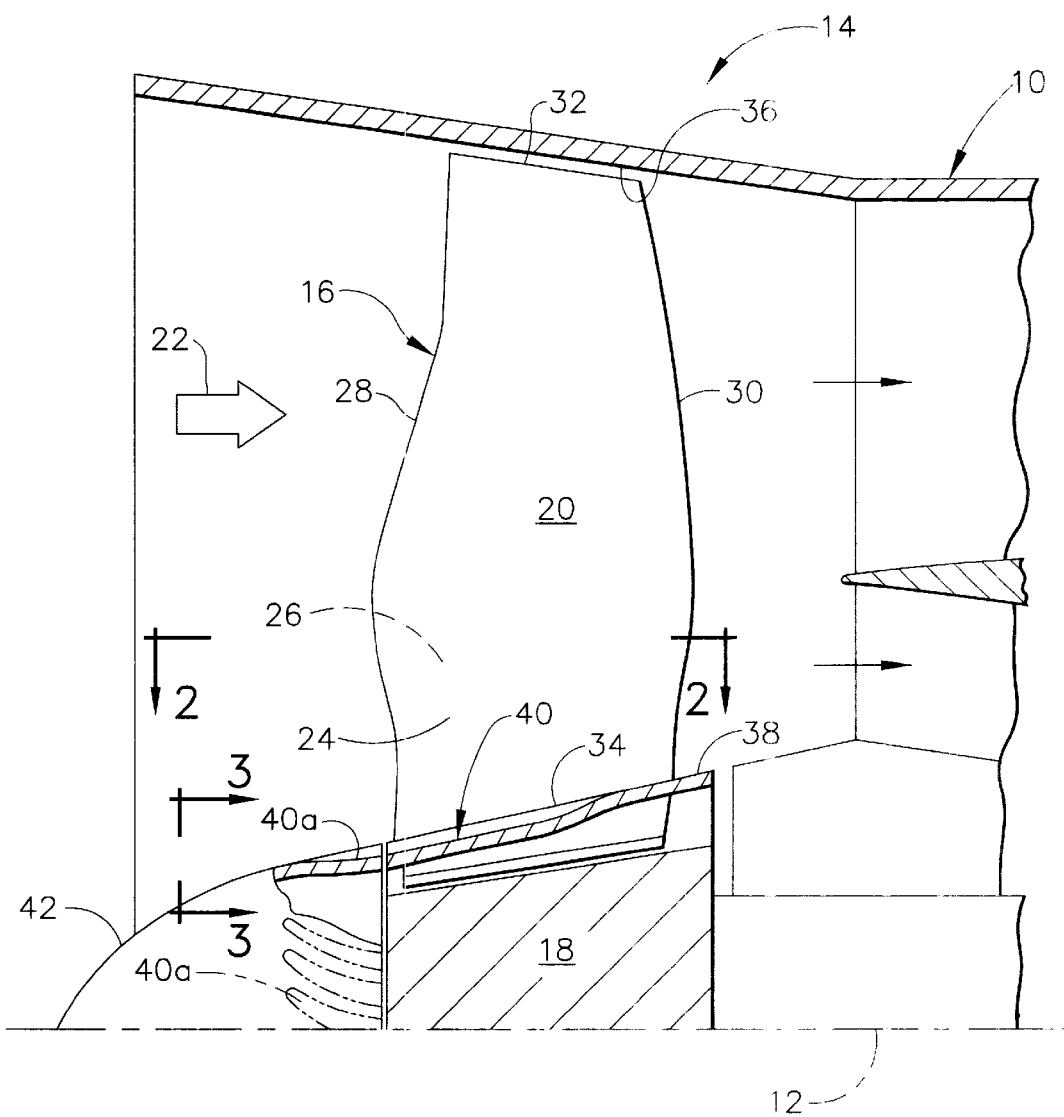
FIG. 1 is an axial sectional view of a fan portion of a gas turbine engine in accordance with an exemplary embodiment of the present invention.

Illustrated in FIG. 1 is a portion of a turbofan gas turbine engine 10 which is axisymmetrical about an axial centerline axis 12. The engine includes a low pressure compressor in the form of a fan 14 suitably powered by a low pressure turbine (not shown). The fan 14 includes a row of fan rotor blades or airfoils 16 extending radially outwardly from a supporting rotor disk 18 in a conventional manner, such as by axial dovetails retained in corresponding dovetail slots in the perimeter of the disk.

Figure 2:
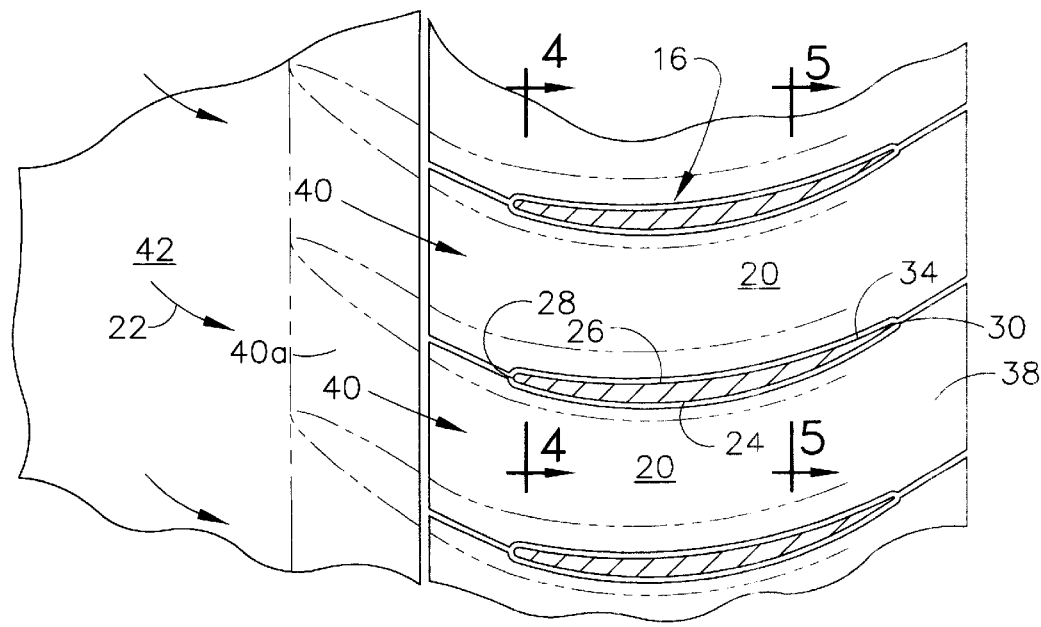
FIG. 2 is a planiform view of adjacent fan blades in FIG. 1 and taken along line 2—2.

The blades 16 illustrated in FIG. 1 are spaced circumferentially or laterally apart as shown in more detail in FIG. 2 and define therebetween corresponding portions of a fan flowpath 20 through which air 22 is channeled during operation. Rotation of the fan disk and blades thereon imparts energy into the air which is initially accelerated and then decelerated by diffusion for recovering energy to pressurize or compress the air.

The air pressurized in the outer span portion of the fan blades is used for producing thrust in propelling an aircraft in flight. Air pressurized through the inner span portion of the blades is channeled to a downstream compressor, described hereinbelow, which further compresses the air which is then mixed with fuel in a combustor (not shown) and ignited for generating hot combustion gases. Energy is extracted from the combustion gases in a high pressure turbine (not shown) for powering the compressor, and additional energy is extracted by the low pressure turbine for powering the fan in a conventional manner.

As shown in FIGS. 1 and 2, each of the blades 16 includes a generally convex suction side 24, and a circumferentially opposite, generally concave pressure side 26. The two sides extend between axially spaced apart leading and trailing edges 28,30, and extend in radial span between a radially outer end 32 defining a blade tip and a radially opposite, inner end 34 defining a blade root.

The fan flowpath 20 illustrated in FIG. 2 is bound circumferentially by the corresponding sides of adjacent fan blades, and is bound radially as shown in more particularity in FIG. 1. An annular fan casing or shroud 36 defines a radially outer border or endwall which circumferentially bridges all of the fan blades at their outer tip ends 32. A plurality of inter-blade platforms 38 are spaced radially outwardly from the disk 18 and are conventionally joined thereto. The individual platforms 38 circumferentially bridge adjacent blades at the inner root ends 34 thereof. Accordingly, fan airflow 22 is bound in operation by the corresponding flowpaths 20 defined circumferentially by adjacent blades 16, and radially by the fan casing 36 and blade platforms 38.

The fan blades 16 illustrated in FIGS. 1 and 2 may have any conventional 3D configuration for pumping the air 22 to produce thrust, with a corresponding compression efficiency and stall margin. The individual fan flowpaths 20 diverge in the axial downstream direction to their exits at the trailing edges for diffusing the air 22 and recovering static pressure therefrom. The fan blades are typically designed for transonic or supersonic Mach flow operation at correspondingly high rotor speed during operation. The blades are therefore subject to shock during operation in which shock waves are created between adjacent blades. The adverse effects of shock are reduced where possible by specifically configuring the airfoil configuration along the span height.

For example, the fan flowpaths 20 typically diverge from an inlet throat of minimum area at the blade leading edges for a majority of the lower span of the blades. The flowpaths at the fan outer spans terminating at the blade tips typically initially converge in the axial direction to a throat of minimum area suitably axially disposed and then diverge in area to the blade trailing edges.

As shown in FIG. 1, the fan casing 36 is spaced from the blade tips 32 to define corresponding small radial gaps or clearances therebetween for permitting rotary movement of the blades inside the stationary casing 36 without undesirable tip rubbing therebetween. The flowpath outer boundary, therefore, is stationary relative to the rotating blades. Correspondingly, the blade platforms 38 defining the flowpath radially inner boundaries is affixed to the rotor disk and rotates with the blades, with no relative rotary movement therebetween.

The size of the blades including their root-to-tip span is initially specified for obtaining a desired amount of flow pumping capability of the fan, which is typically expressed in mass per unit time. Correspondingly, the inner diameter of the fan casing 36 and the outer diameter of the blade platforms 38 relative to the engine centerline axis 12 are also specified and thusly limit the available flow area for the respective flowpaths 20.

The 3D aerodynamic configurations of the fan blades may be optimized using modem 3D viscous computer analysis for achieving maximum flow pumping and compression efficiency with suitable stall margin which varies as a function of engine speed from low to high speed required for typical operation of the engine in powering an aircraft from idle to cruise to maximum power operation.

Figure 3:
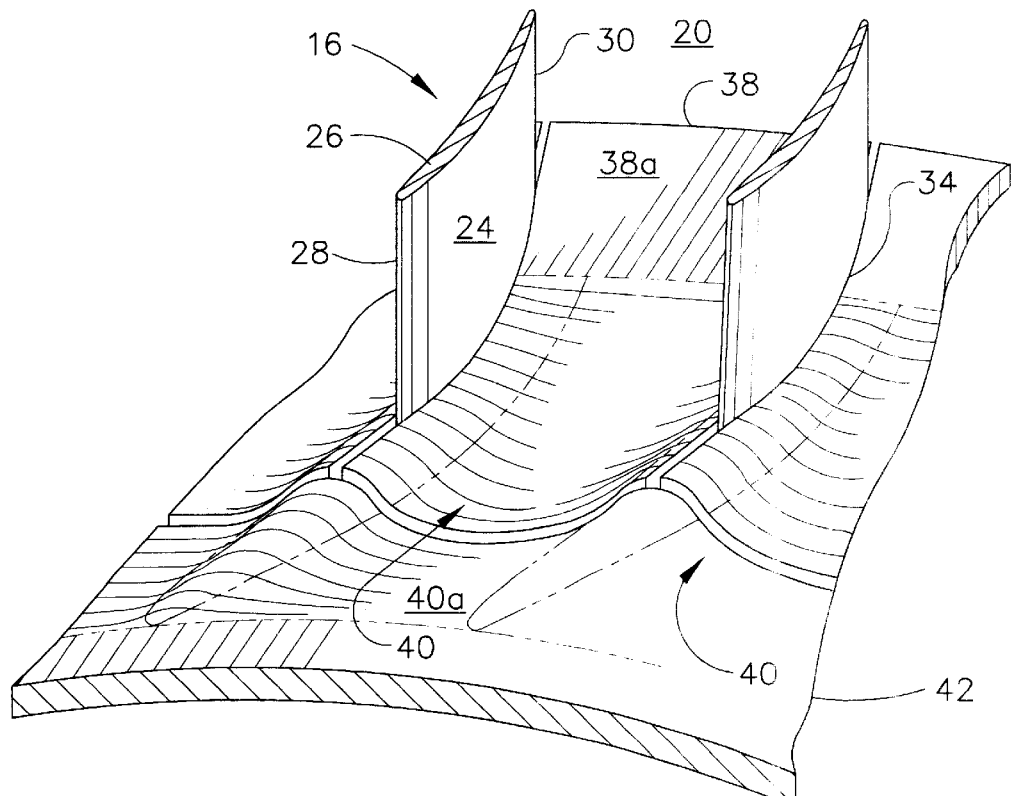
FIG. 3 is an isometric view of root portions of adjacent fan blades and inner flowpath walls in the fan illustrated in FIG. 1 and taken generally along line 3—3.

In accordance with an exemplary embodiment of the present invention as illustrated in FIGS. 1 and 2 each of the platforms 38 which defines the flowpath inner boundary or a wall includes a trough or flute 40 disposed adjacent the blade leading edges 28 for locally increasing flow area thereat. Preferably, a single flute 40 is disposed between corresponding adjacent blades and defines a dimple which is circumferentially concave for locally increasing flowpath area. As illustrated in FIGS. 2 and 3, each flute 40 extends laterally in width circumferentially between adjacent leading edges 28, and extends in length axially aft from the leading edges.

Each flute 40 preferably has a substantially uniform circumferential width from its commencement to termination. Each flute 40 preferably terminates in the platform 38 axially forward or upstream from the blade trailing edges 30. At its termination, the flute transitions to the circumferentially convex land 38a of the remaining platform surface.

Figure 4:
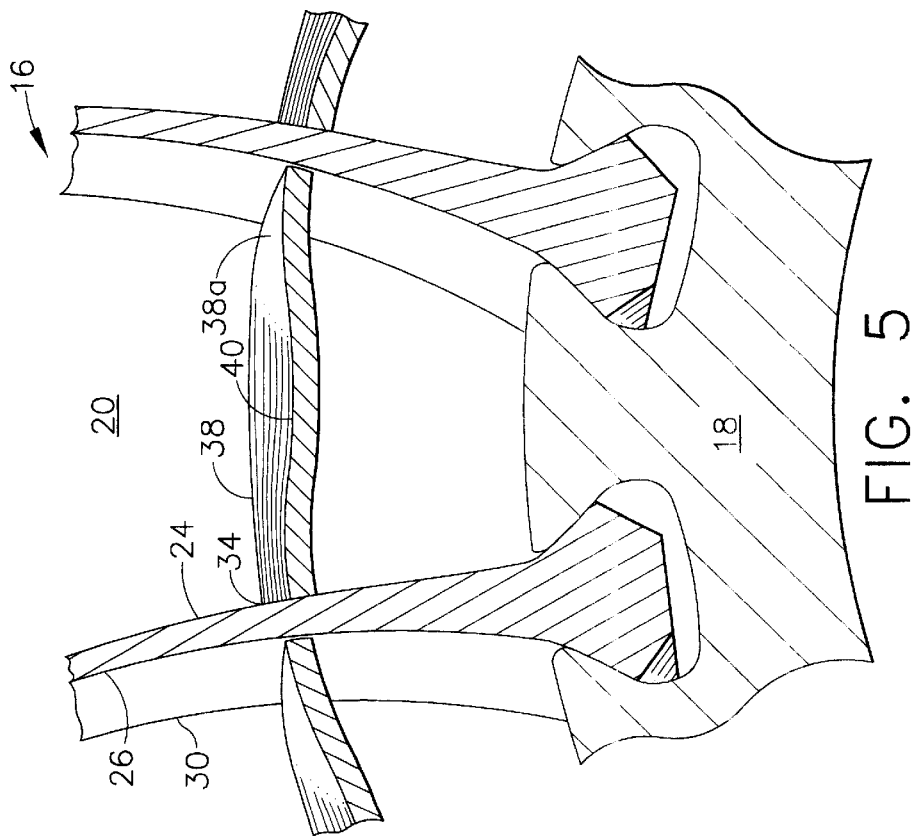
FIG. 4 is a radial sectional view through adjacent fan blades illustrated in FIG. 2 near leading edges thereof and taken along line 4—4.
Figure 5:
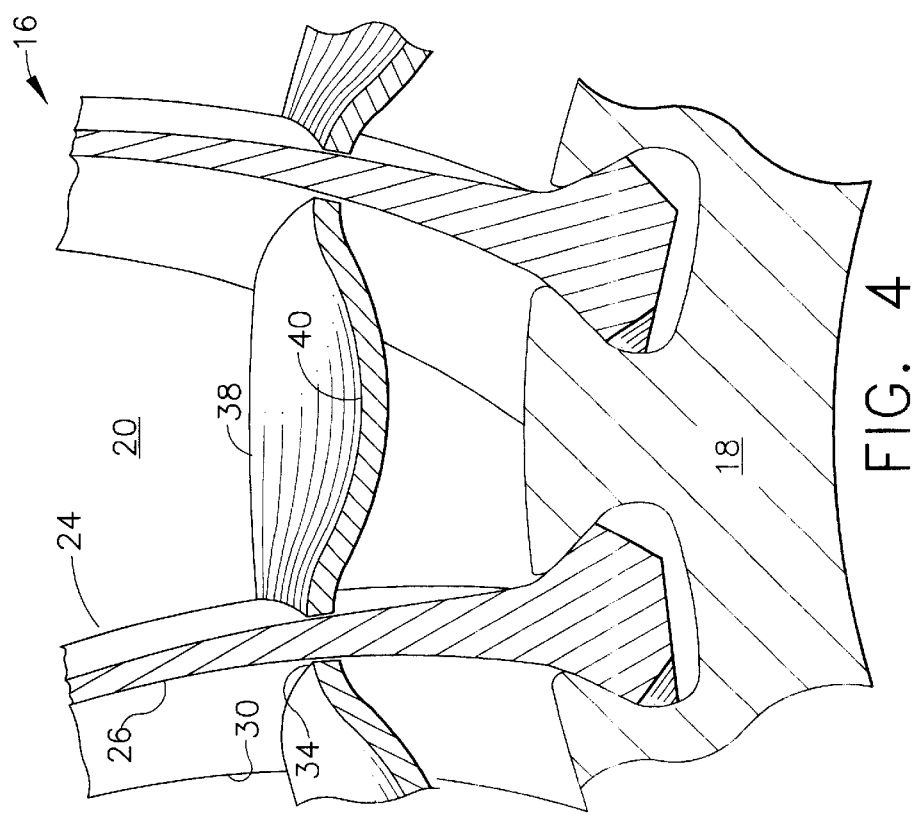
FIG. 5 is a radial sectional view of adjacent fan blades illustrated in FIG. 2 near trailing edges thereof and taken along line 5—5.

This preferred form of the flutes 40 has many advantages for a compressor, such as a low pressure fan or high pressure compressor, which is constrained in overall size by geometric boundaries such as the outer and inner diameters of the flowpath boundaries. For example, the radially inward concave flutes 40 in the platforms 38 illustrated in FIGS. 3–5 provide a local increase in flowpath area near the blade roots 34 between the leading and trailing edges.

This increased area cooperates with the diverging flowpaths 20 to locally lower average Mach number of the airflow near the blade leading edges, which permits less diffusion to achieve the required pressure rise between the blade leading and trailing edges. The locally lower Mach flow correspondingly decreases skin friction drag in this region to correspondingly increase compression efficiency. For subsonic operation, the increased flowpath area at the blade leading edges enjoys increased compression efficiency, and additionally permits the diffusion loading distribution over the blade airfoils to be modified for further performance advantage to complement the lower diffusion.

For supersonic operation subject to shock waves, the local increase in area provided by the flutes at the blade leading edges additionally opens or increases the flowpath induction area. Induction area is a term of art and is defined between the leading edge of one blade and just aft of the leading edge of the next adjacent blade on its suction side in which the first captured Mach wave is found. By locally opening the induction area in the blade platforms near the leading edges, increased flow capacity or pumping of the fan stage is obtained with an increase in compression efficiency.

Locally opening the induction area and flowpath throat in this region decreases the effective camber at high speed operation of the fan. This in turn increases high speed flow capacity and efficiency by significant amounts as confirmed by back-to-back analyses of an otherwise identical fan design differing only in the introduction of the flutes as opposed to a corresponding non-fluted platform.

The introduction of the fluted blade platforms provides improved performance alone, yet also permits further modification of the loading distribution of the fan blades near their roots not otherwise possible given conventional constraints on compression performance including stall margin. The aerodynamic contour of the blades may thusly be further optimized to complement the introduction of the fluted platforms for further increasing flow pumping capacity of the fan and compression efficiency, while still maintaining a suitable stall margin. For example, the fluted platforms are effective for reducing passage shock strength for supersonic operation, and also reducing secondary flow fields near the blade roots.

By reducing local diffusion levels and shock strength with the introduction of the platform flutes, pressure losses are reduced as the flow limit imposed by annulus choking is approached. On a transonic rotor, the high speed flow may be limited by the unique incidence condition on the suction side of the fan blades that runs from the blade leading edge back to the first captured Mach wave of the suction surface in the induction region or area. The flutes increase induction area and result in more airflow being passed for the same unique incidence condition. Furthermore, the corresponding flow area distribution attributed to the platform flutes increases the annulus convergence across the blade row. Particularly at high flow rates, this leads to less separation and hence better rotor efficiency.

The increased area obtained by fluting the blade platforms is achieved without otherwise increasing the blade span which may be held to a given size for a given application. Increased flow area is obtained without change in mechanical or aero-mechanical performance associated with increasing blade span, and without the additional weight which would otherwise be required therefor.

For maximum benefit, the individual flutes 40 illustrated in FIGS. 1–3 should commence axially forward or upstream of the blade leading edges 28 within the available space in the engine. For example, the fan illustrated in FIG. 1 includes a conical spinner 42 which axially adjoins the row of fan blades and platforms 38 with a corresponding splitline or axial gap therebetween disposed upstream of the blade leading edges. Each flute 40 preferably includes an inlet portion 40a disposed in the outer surface of the spinner 42 and commences in the spinner at a suitable location upstream from the blade leading edges and then continues aft into the corresponding blade platforms 38. The flute inlet portions 40a blend smoothly with the main flutes 40 at the junction between the spinner and platforms.

In the preferred embodiment illustrated in FIGS. 2 and 3, each flute 40 preferably has a substantially uniform circumferential width from its commencement in the spinner 42 to the blade leading edges 28 in the platforms and then maintains its uniform width between the blade sides toward the termination or end thereof preferably upstream from the blade trailing edges 30 in the platforms. The axial profile of the flutes 40 preferably matches the predominant direction of the flow streamlines traveling between the adjacent blades, which is generally crescent in shape.

The configuration of the flutes may be varied as desired for maximizing their performance advantage. For example, single or multiple flutes may be used between adjacent fan blades, and the circumferential contour of the flutes may vary as desired for maxmizing performance and providing a suitable transition with the blade sides. The contours of the platforms lands may be further changed to complement the aerodynamic performance of the cooperating flutes in other designs as desired.

Figure 6:
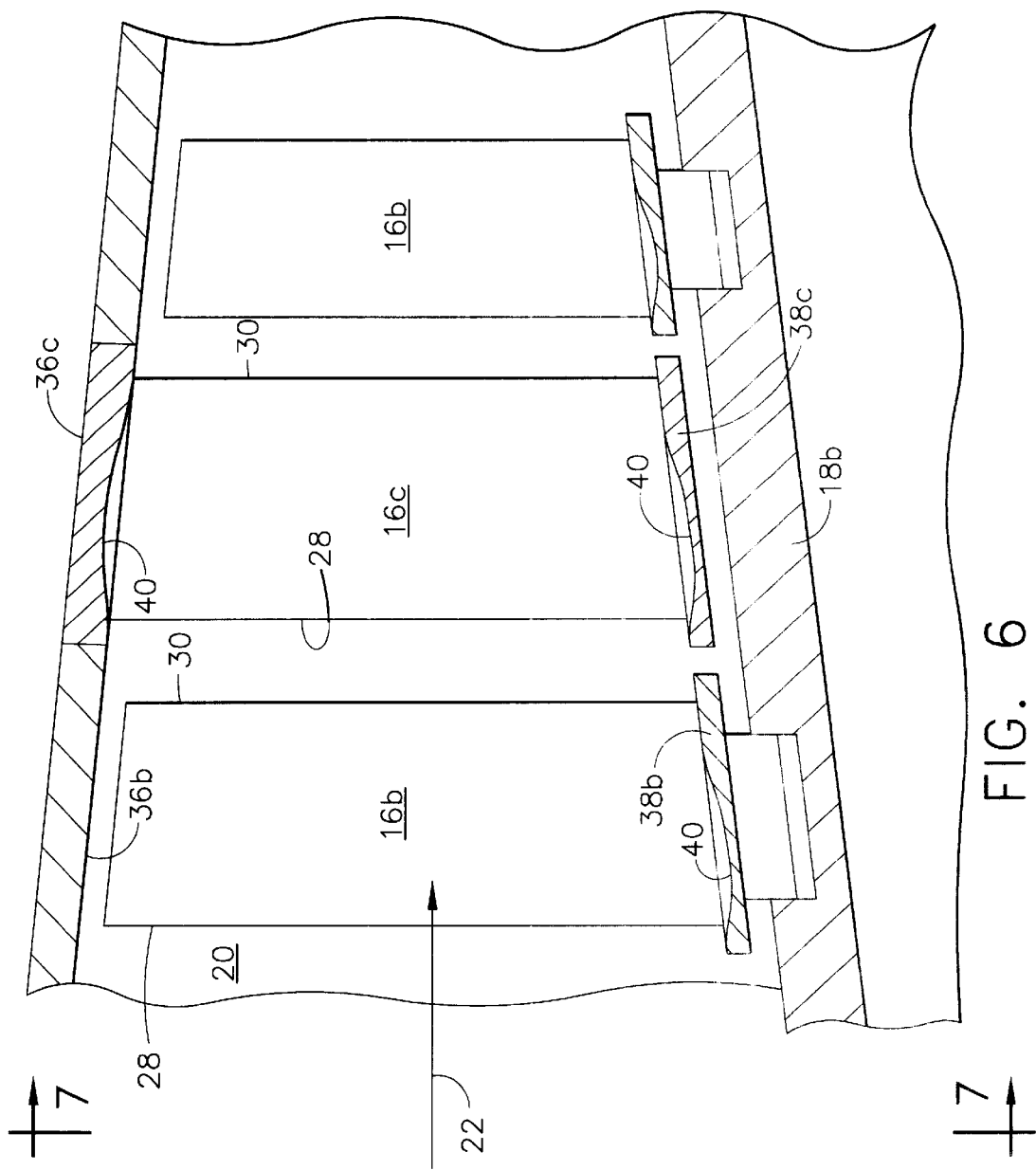
FIG. 6 is a partly sectional, axial view of a portion of a multistage axial compressor disposed downstream from the fan illustrated in FIG. 1 in accordance with another embodiment.
Figure 7:
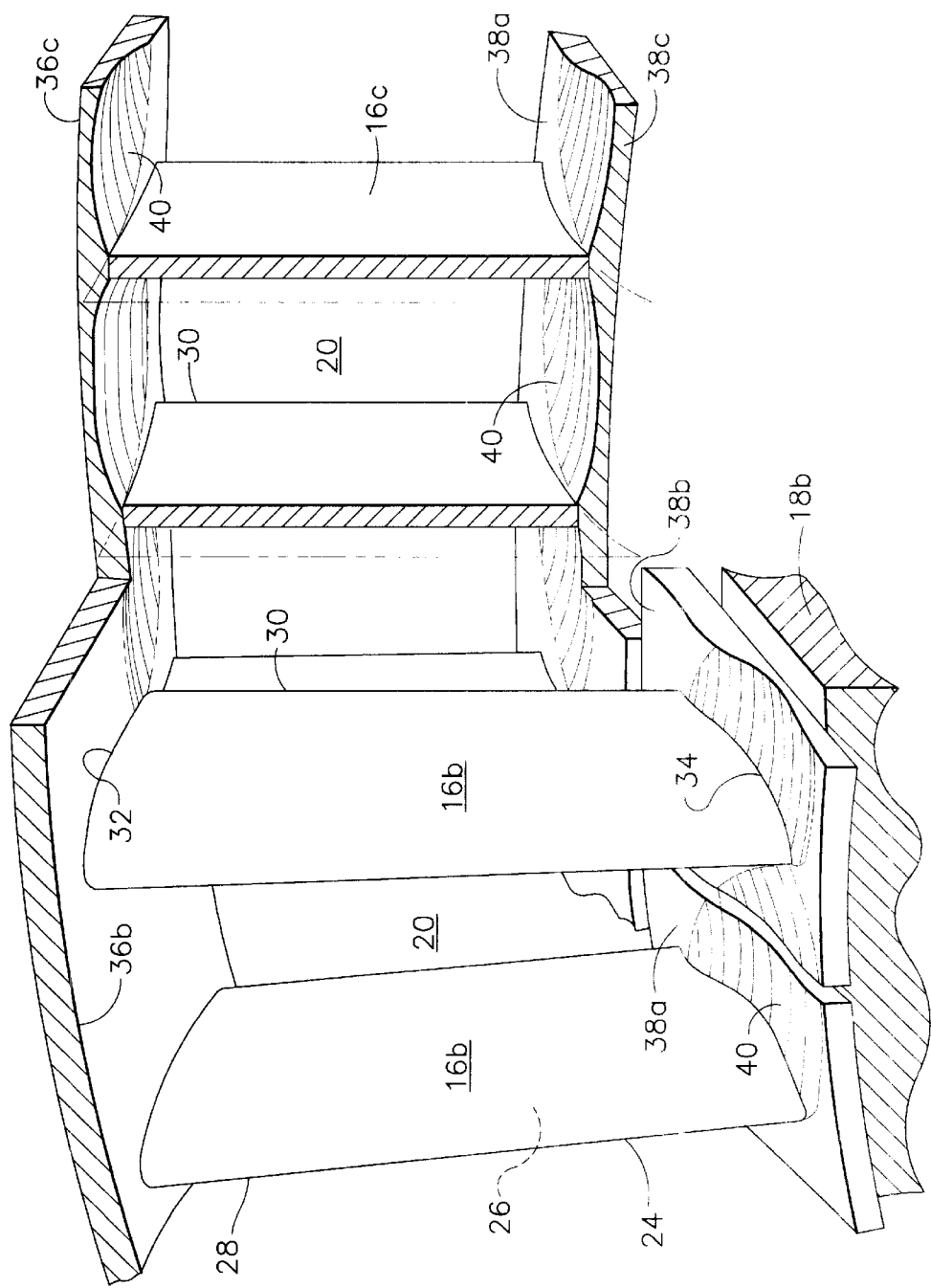
FIG. 7 is a radial sectional view of adjacent portions of rotor and stator stages of the compressor illustrated in FIG. 6 and taken along line 7—7.

The flutes 40 described above for use in the platforms of the fan blades may also be used to advantage in corresponding flowpaths, also designated 20, between compressor rotor blades or airfoils, designated 16b, as illustrated in FIGS. 6 and 7. Like the fan blades, the compressor blades 16b extend radially outwardly from a supporting rotor disk in the form of an annular drum 18b. The corresponding compressor flowpaths 20 are defined circumferentially between adjacent compressor blades and radially between a corresponding compressor casing or outer wall 36b and radially inner blade platforms 38b. Whereas the fan blade platforms 38 illustrated in FIG. 1 are discrete components mounted between adjacent fan blades, the compressor blade platforms 38b illustrated in FIGS. 6 and 7 are integrally joined to the roots of the corresponding compressor blades and adjoin each other near the middle of each flowpath.

The flutes 40 may be introduced in the compressor blade platforms 38b in substantially the same manner as in the fan blade platforms described above. However, since no spinner is found in the axial compressor stages illustrated in FIG. 6, the flutes typically commence just aft of the leading edges of the individual platforms 38b themselves in view of the limited axial space provided with upstream stator vanes.

Since the compressor blades 16b are configured in an aerodynamically similar manner to the larger fan blades, correspondingly sized flutes 40 may be similarly introduced in the compressor platforms 38b. Each flute 40 again extends in width circumferentially between the leading edges of adjacent compressor blades, and terminates in length axially forward of the trailing edges 30.

In this embodiment, the flutes simply converge in width between the leading and trailing edges in the axially aft direction. Each flute thusly converges or decreases in circumferential width from the blade leading edges 28 axially toward the trailing edges 30.

Since the aerodynamic loading on the blade suction and pressure sides is different, the flutes 40 are configured in profile to complement the different aerodynamic loading. Preferably, each flute 40 adjoins the suction side 24 of one blade 16b, and diverges from the pressure side 26 of the adjacent blade 16b defining the flowpath 20 therebetween.

As shown in FIG. 7, each flute 40 is initially circumferentially concave radially inwardly between the leading edges of adjacent blades 16. As each flute 40 converges in width from leading to trailing edges 28,30, it follows the convex contour of the adjoining blade suction side 24 but diverges away from the pressure side 26 of the adjacent blade.

As shown in FIG. 7, the flute 40 remains concave as it decreases in circumferential width, and transitions to a circumferentially convex land 38a of the platform in which the flute is formed. But for the introduction of a concave flute 40, the outer surfaces of the individual blade platforms 38 are circumferentially convex radially outwardly in a conventional manner. The concave flutes 40 reverse the curvature of the platform outer surface to provide the locally increased flow area therein while the non-fluted portions of the platform, such as the lands 38a, remain convex in outer profile.

The resulting crescent axial profile of the individual flutes 40 matches the predominant streamlines of the airflow between adjacent blades, and locally increases flow area in the respective flowpaths 20 commencing near the blade leading edges and terminating near the blade trailing edges. The flutes 40 thusly follow substantially the entire axial profile of the blade suction sides 24, while diverging away from the blade pressure sides 26 downstream from the leading edges thereof. The simple concave flute enjoys the many advantages described above for subsonic or supersonic operation.

FIGS. 6 and 7 illustrate yet another embodiment of the invention wherein the compressor flowpaths 20 are defined between adjacent stator vane airfoils, designated 16c, which extend radially between an annular outer band or endwall 36c and a radially inner band or endwall 38c. The individual vanes 16c are suitably affixed at the respective outer and inner ends to the corresponding bands. The bands are typically formed in arcuate segments to collectively form rings. The inner band 38c may be optional, and in some designs the vane inner ends are simply plain without attached bands.

Like the previous two embodiments, the flutes 40 may be correspondingly sized for use in at least the outer band 36c, and the inner band 38c if desired, for further increasing performance of the stator vanes. Just as in the previous embodiments, the flutes may be provided in the stator bands for locally increasing flow area therein for improving aerodynamic performance and efficiency in an analogous manner.

In all three embodiments disclosed above, the corresponding compressor flowpaths 20 are defined circumferentially between the adjoining fan blade airfoils 16, compressor blade airfoils 16b, or stator vane airfoils 16c. The flowpaths are also defined radially between the corresponding outer and inner walls in the form of casings, bands, or platforms. In all embodiments, the corresponding flutes 40 are introduced in endwalls which have a fixed relationship with the adjoining airfoils which are configured for effecting diffusion of the airflow.

The corresponding flutes may be similarly configured in concave profile, and have suitable width and contour circumferentially between blades, and suitable contours axially between the leading and trailing edges. Analysis may be used for optimizing the individual contours of the respective flutes for best performance in each of the specific applications disclosed above. The individual flutes introduced into the corresponding flowpath endwalls locally increase flow area, with the endwalls being otherwise conventional in configuration and size.

Accordingly for a given geometry of a fan stage, compressor rotor stage, or compressor stator stage, the flutes may be introduced therein for providing additional performance advantage without otherwise changing the geometry of the respective stages.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the united states is the invention as defined and differentiated in the following claims in which we claim:

1. A compressor flowpath for diffusing air comprising:
a plurality of airfoils spaced circumferentially apart, and each including axially spaced apart leading and trailing edges and radially spaced apart outer and inner ends;
a radially outer wall bridging said airfoils at said outer ends, and a radially inner wall bridging said airfoils at said inner ends; and
at least one of said walls includes a circumferentially concave flute adjacent said leading edges for locally increasing flow area thereat.

2. A flowpath according to claim 1 wherein said flute terminates axially forward of said trailing edges.

3. A flowpath according to claim 2 wherein said flute extends in width circumferentially between said leading edges and extends in length axially aft therefrom.

4. A flowpath according to claim 3 wherein said flute decreases in width from said leading edges toward said trailing edges.

5. A flowpath according to claim 4 wherein:
each of said airfoils further includes a generally convex suction side, and a circumferentially opposite, generally concave pressure side; and
said flute adjoins said suction side of one airfoil, and diverges from said pressure side of an adjacent airfoil.

6. A flowpath according to claim 5 wherein said flute is circumferentially concave adjacent one airfoil and transitions to a circumferentially convex land adjoining an opposite airfoil.

7. A flowpath according to claim 3 wherein said flute commences axially forward of said leading edges.

8. A flowpath according to claim 7 wherein said flute is substantially uniform in width from said commencement thereof to said leading edges and then is substantially uniform in width toward said termination thereof.

9. A flowpath according to claim 3 wherein:
said airfoils comprise fan rotor blades extending radially outwardly from a supporting disk;
said outer wall comprises an annular fan casing; and
said inner wall comprises a blade platform spaced radially outwardly from said disk.

10. A flowpath according to claim 9 further comprising a conical spinner adjoining said platform at said blade leading edges, and said flute commences in said spinner and continues aft in said platform.

11. A flowpath according to claim 3 wherein:
said airfoils comprise compressor rotor blades extending radially outwardly from a supporting rotor drum;
said outer wall comprises an annular compressor casing; and
said inner wall comprises blade platforms integrally joined to respective ones of said blades radially outwardly from said drum.

12. A flowpath according to claim 3 wherein:
said airfoils comprise compressor stator vanes;
said outer wall comprises an annular outer band affixed to said vane outer ends; and said inner wall comprises an annular inner band affixed to said vane inner ends.

13. A flowpath according to claim 3 wherein both said outer and inner bands include respective ones of said flutes therein.

14. A fan flowpath for diffusing air comprising:

a plurality of circumferentially spaced apart fan rotor blades extending radially outwardly from a supporting rotor disk, and each including axially spaced apart leading and trailing edges and radially spaced apart root and tip;

an annular fan casing spaced radially from said blade tips and circumferentially bridging said blades thereat;

a plurality of platforms spaced radially outwardly from said disk, and circumferentially bridging said blades at said roots thereof; and each of said platforms include a circumferentially concave flute adjacent said leading edges for locally increasing flow area thereat.

15. A flowpath according to claim 14 wherein said flute commences axially forward of said leading edges, terminates axially forward of said trailing edges, and extends in width circumferentially between adjacent blades.

16. A flowpath according to claim 15 wherein said flute is substantially uniform in width from said commencement thereof to said leading edges and then is substantially uniform in width toward said termination thereof.

17. A compressor flowpath for diffusing air comprising:

a plurality of circumferentially spaced apart compressor rotor blades extending radially outwardly from a supporting rotor drum, and each including axially spaced apart leading and trailing edges and radially spaced apart root and tip;

a compressor casing spaced radially from said blade tips and circumferentially bridging said blades thereat;

a plurality of platforms spaced radially outwardly from said drum, and circumferentially bridging said blades at said roots thereof; and each of said platforms includes a circumferentially concave flute adjacent said leading edges for locally increasing flow area thereat.

18. A flowpath according to claim 17 wherein said flute extends in width circumferentially between said leading edges, and terminates in length axially forward of said trailing edges.

19. A flowpath according to claim 17 wherein said flute converges in with from said leading edges to said trailing edges.

20. A compressor flowpath for diffusing air comprising:

a plurality of circumferentially spaced apart compressor stator vanes each including axially spaced apart leading and trailing edges and radially spaced apart outer and inner ends;

an annular outer band affixed to said vane outer ends; and said outer band includes a circumferentially concave flute adjacent said leading edges for locally increasing flow area thereat.

21. A flowpath according to claim 20 wherein said flute extends in width circumferentially between said leading edges, and terminates in length axially forward of said trailing edges.

22. A flowpath according to claim 21 wherein said flute converges in width from said leading edges to said trailing edges.

23. A flowpath according to claim 22 further comprising an annular inner band affixed to said vane inner ends, and said inner band includes a flute between said vane leading edges for locally increasing flow area thereat.

* * * * *